United States Patent Office 3,527,992
Patented Sept. 8, 1970

3,527,992
ELECTROSTATIC GENERATOR
Alfred William Bright and Brian Makin, Southampton, England, assignors to National Research Development Corporation, London, England, a British corporation
Filed Dec. 3, 1968, Ser. No. 780,774
Claims priority, application Great Britain, Dec. 4, 1967, 55,101/67
Int. Cl. H02n 1/00
U.S. Cl. 318—116
14 Claims

ABSTRACT OF THE DISCLOSURE

An electrostatic generator which operates with a liquid (e.g. nitrobenzene) insulant. The conductivity of the liquid is kept at a very low figure by a de-ionising the liquid, e.g. by electrodialysis. The generator employs a single rotary disc as the charge carrier, with a charge collector angularly spaced from a charge supplied.

---

The invention relates to electrostatic generators.

In conventional electrostatic generators the power output is determined by a number of parameters, the most important of these being the electrical breakdown strength of the insulating medium in which the generator operates, the rotational speed and area of the rotor. There are at present practical limits to the power output which can be achieved by existing electrostatic generators and it is difficult to exceed power outputs of 1 watt per square cm. of rotor surface. This is because it is difficult to exceed electric breakdown fields of 300 kv./cm. in generators using gaseous insulants such as hydrogen or carbon dioxide under pressure (e.g. 20 atmospheres) or on those using vacuum insulation.

The use of pressurised gas as the insulating medium, however, is necessarily expensive, entailing the use of high pressure seals, and an object of the present invention is to provide an electrostatic generator of relatively inexpensive and compact construction having a higher output power density than conventional electrostatic generators.

An electrostatic generator according to the present invention comprises a movable charge carrier which in operation transports charge from charge supply means to a charge pick-up device at higher potential than said supply means, the charge carrier being immersed in a non-conducting dielectric liquid so that charge transfer takes place entirely in said liquid.

The electrostatic generator according to the present invention is potentially capable of providing a greater power output than conventional electrostatic generators hitherto used. For comparing the power outputs of electrostatic generators it is convenient to consider a parameter referred to herein as the "normalised power $p$" and defined as the ratio:

$$\frac{\text{power output}}{\text{area of charge carrier} \times \text{average linear velocity of charge carrier}}$$

The highest values of $p$ obtainable on conventional electrostatic generators using gas or vacuum insulation are of the order of 250 watts. sec. m.$^{-3}$.

It can be shown, however, that for an electrostatic generator employing a liquid insulant the normalised power $p$ is further proportional to the relative permittivity $e_1$ of the liquid insulant. Theoretically, therefore, it would be possible to obtain normalised powers $p$ of the order of 5,000 watts, sec. m.$^{-3}$, by using a liquid with relative permittivity $e_1=20$.

In practice most dielectric liquids have a residual conductivity due to the presence of stray ions and charged particles therein, rendering them unsuitable as the insulant in an electrostatic generator required to operate for extended periods of time. We have found, however, that a satisfactory electrostatic generator for continuous operation can be made if the generator includes purifying apparatus for removing ions from said liquid. Generators without such purifying apparatus are useful for demonstration or teaching purposes.

Preferably the charge carrier comprises a rotor of dielectric material which is mounted for rotation about an axis in a housing filled with the same liquid, the charge supply means and the charge collector means being spaced from a surface of the rotor which is symmetrical relative to the said axis, the charge collector means being angularly spaced from the charge supply means around said axis.

In one embodiment of the invention the charge supply means and the charge collector means may each have angularly aligned therewith but spaced therefrom a respective inductor means, portions of the rotor defining said surface, being interposed between the charge supply means and its respective inductor means and between the charge collector means and its respective inductor means.

The charge supply means may comprise a semi-conductive element, means being provided to control the rate at which charge transfer occurs by means of a control voltage applied to the semi-conductive element of the charge supply means.

The semi-conductive element may be a tunnel diode.

In another embodiment of the invention the charge supply means and the charge collector means may comprise respective knife edge members spaced from said surface.

In operation, the liquid may move relatively to the said knife edge members, the knife edge members being disposed so that the knife edges extend at least approximately parallel to said relative movement.

Thus, the knife edges may extend tangentially to imaginary circles centered on the axis of the rotor.

The rotor may be a disc, the said surface being a radially extending face of the disc.

Each knife edge may extend radially with respect to the axis of rotation of the disc.

However the invention may be employed in belt or cylinder machines, and therefore the said surface of the rotor may be cylindrical with respect to the axis thereof.

Thus the rotor may be a disc having an axially extending flange forming said cylindrical surface.

The purifying means may comprise a de-ionising medium embodied in at least the induction means aligned with the charge collector means.

At least the inductor means aligned with the charge collector means may comprise a member of a porous or perforated non-conductive material having a surface exposed to the liquid and an electrically conductive element arranged to exchange charged particles with the said member.

The de-ionising medium may be disposed between the said member and the electrically conductive element.

The porous material may be a sintered glass, or plastics material.

Alternatively, the member may comprise a plastics diaphragm pierced by a plurality of holes which permit the passage of ions therethrough but prevent the escape of de-ionising medium therethrough.

There may be provided a plurality of charge supply means and an equal number of charge collector means disposed alternately in angularly spaced apart relationship around the axis of the rotor, the charge supply means and the charge collector means being respectively connected in parallel.

Preferably the dielectric liquid is capable of withstanding without breakdown electrostatic fields of not less than 100 kilovolts per centimetre.

The rotor may be made of a material having a resistivity not less than that of glass and preferably has a relative permitivity not significantly less than that of the dielectric liquid.

Thus the rotor material may be barium titanate and the dielectric liquid may be nitrobenzene.

Alternatively, or in addition, the purifying means may include purifying apparatus for removing ions from said liquid and means for circulating said liquid in a closed circuit between the generator and said purifying apparatus.

Thus the purifying apparatus may include an electrodialysis cell.

The housing may be provided with a respective inlet and outlet for the dielectric liquid, the inlet being located radially outwardly with respect to the axis of rotation of the rotor disc, of the outlet.

The housing may comprise two separable halves which on separation permit access to the rotor.

The embodiments of the invention in which the rotor is a disc may have certain advantages over other configurations such as belt or cylindrical machines in as much that the rotor disc is rigidly supported maintaining constant clearances between the rotor disc and the charge supplying means and the charge collector means. The disadvantages of the other types are the flexibility of the belt in belt machines and in cylinder machines the necessity of supporting the cylinder at one end only. Moreover it is possible by using liquid insulation and by the preferred embodiment of this invention to make relatively small disc machines for a given output contrary to what has been previously believed.

The invention will be described, merely by way of example, with reference to the accompanying drawings, in which.

Figure 1:
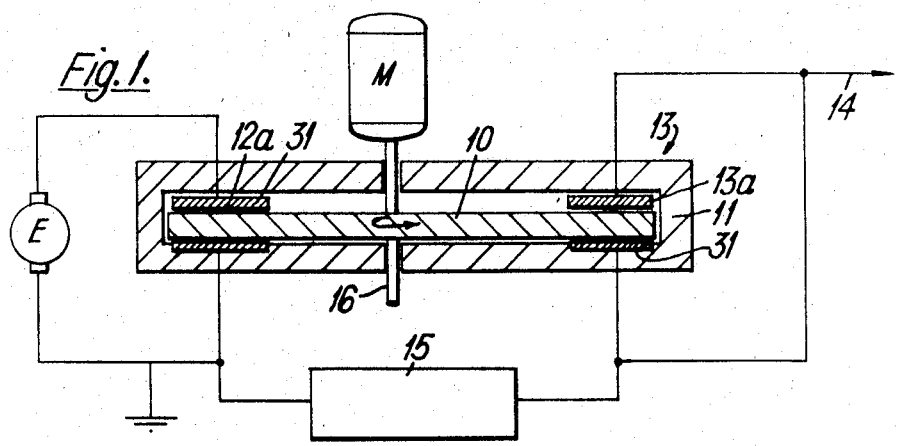
FIG. 1 illustrates diagrammatically a basic circuit configuration for the electrostatic generator according to the invention.

Referring first to FIG. 1 an electrostatic generator has a movable charge carrier in the form of a solid rotor disc 10 of insulating material, such, for example, as glass or polytetrafluorethylene (P.T.F.E.) which is mounted coaxially within a flat cylindrical housing 11. The housing 11 is also made of insulating material, for example that sold under the registered trademark "Nylon."

Arranged at angularly spaced, preferably diametrically opposite, positions relative to the rotor disc 10 are charge supply means 12 and a charge collector means 13, each of which comprises a radially extending knife edge 12a, 13a spaced at a predetermined distance from one face of the rotor disc 10 which it will be appreciated is symmetrical relative to the axis of the rotor disc. The charge supply means 12 and charge collector means 13 are connected in the conventional manner. Thus the charge supply meas 12 is connected across a direct current generator E, and the charge collector means 13 is connected to a high voltage output line 14, the output power being controllable by means of a variable feedback device 15 interconnecting the supply means 12 and the collector means 13. The rotor disc 10 is supported on a shaft 16 which is mounted in bearings 17 in the housing 11 for rotation about its axis. The shaft is rotatably driven by a motor M.

Figure 2:
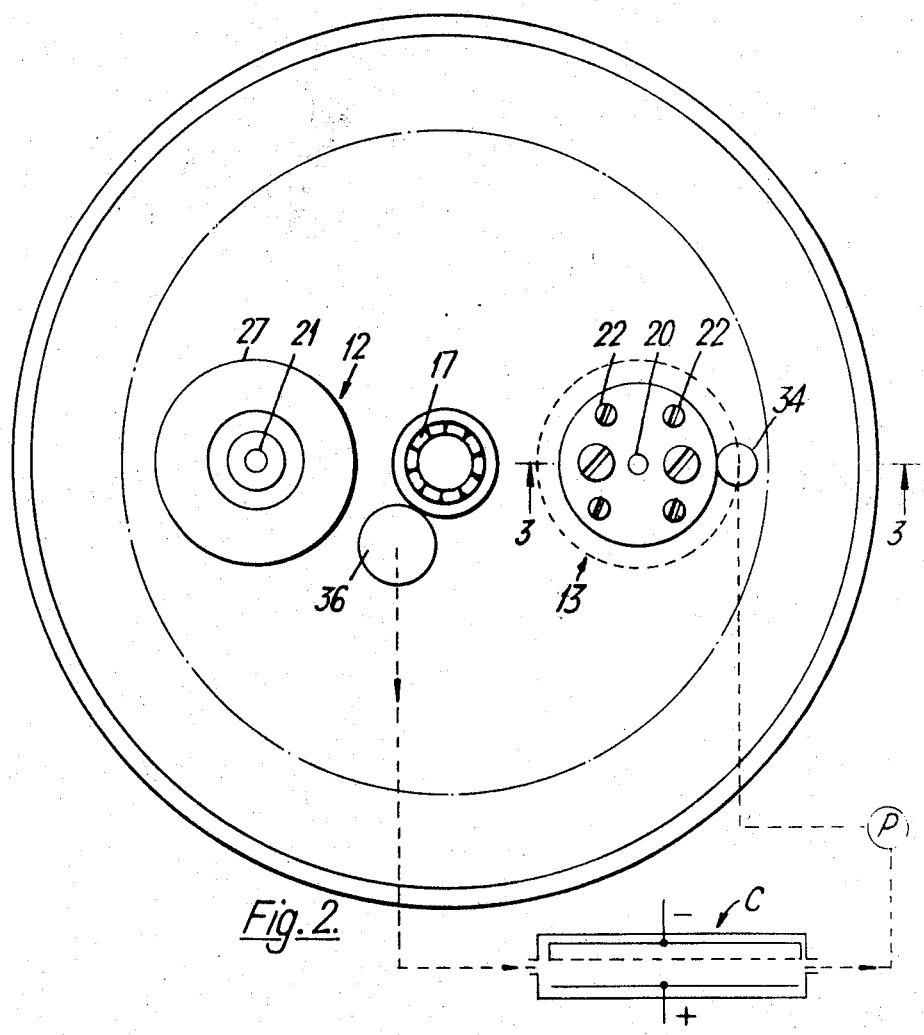
FIG. 2 is a diagrammatic side elevation of the electrostaic generator according to one embodiment of the invention, viewed in a direction perpendicular to the plane of the rotor disc thereof.
Figure 3:
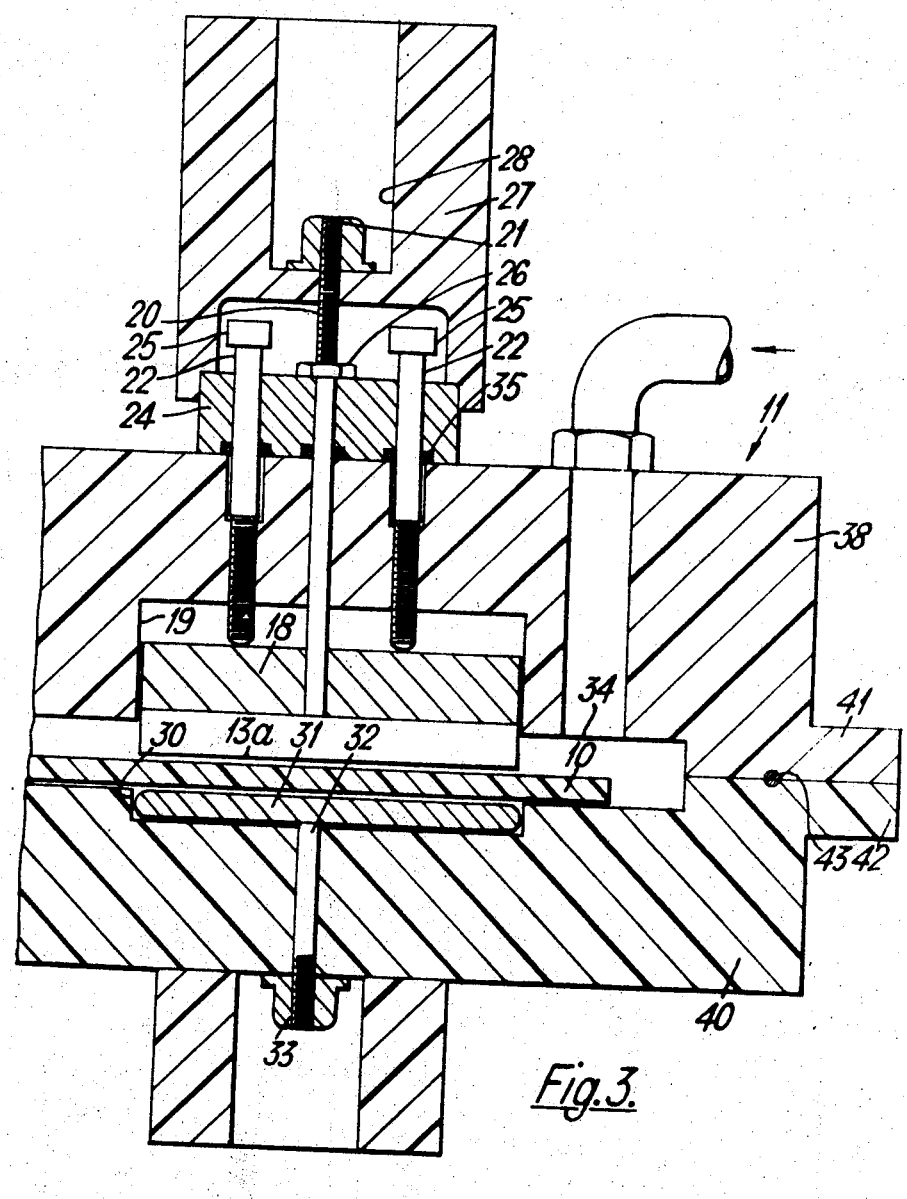
FIG. 3 is a diagrammatic cross section through part of the generator shown in FIG. 2, taken on the line 3—3 of FIG. 2.

Further details of the generator are shown in FIGS. 2 and 3. FIG. 3 shows in section the charge collector means 13 and part of the rotor disc 10. It will be understood that the construction of the charge supply means 12 is substantially identical to that of the collector means 13 shown in FIG. 3. The respective knife edge 13a is provided on an insulator insert 18 which is located in an internal recess 19 in the housing 11 and which is movable within the recess 19 towards and away from the adjacent surface of the rotor disc 10. The insert 18 is provided with a metal connector member 20 which provides electrical connection from the knife edge 13a to an external terminal 21 and which also supports the insert 18 against four adjustable screw-stops 22, two only of which are shown in FIG. 2. The connector member 20 and the screw-stops 22 pass through the wall of the housing 11 and through apertures in an insulating block 24. At their outer ends the screw-stops 22 are provided with enlarged heads 25, which are normally spaced from the upper surface of the block 24. When fitting the insert 18 in the recess 19 the connector member 20 is adjusted until the insert 18 rests against the four screw-stops 22, the settings of the latter being adjusted until the respective knife edge 13a is spaced at the requisite distance from the surface of the rotor disc 10. A slip gauge is inserted between the enlarged heads 25 and the upper surface of the block 24 to check the settings of the stops 22. The connector member 20 is then locked in position by means of a lock nut engaging the upper surface of the block 24.

An insulating cap 27 is fitted over the block 24 and has an axial bore 28 therein which accommodates the terminal 21. The cap 27 for the charge collector means 13 is not shown in FIG. 2, but that of the charge supply means 12 is shown in position.

Directly opposite the recess 19 the housing 11 is provided with a further recess 30 which accommodates a flat inductor plate 31, the surface of which is substantially flush with the internal surface of the housing 11, and close to the adjacent surface of the rotor disc 10. The plate 31 is provided with a connector 32 leading to a terminal 33 externally of the housing 11.

A polar insulating liquid, preferably nitrobenzene, is introduced into the housing 11 through an inlet 34 near the radially outer periphery of the rotor disc 10. The polar liquid entirely fills the interior of the housing 11, so that the rotor disc 10 is immersed therein. Sealing rings 35 are provided on the block 24 to seal against leakage, the apertures receiving the screw-stops 22 and the connector member 20. The liquid is circulated through the housing 11, and withdrawn from an outlet 36 disposed near the radially inner periphery of the rotor disc 10, as shown in FIG. 2.

The polar liquid is circulated by a pump P (FIG. 2) from the outlet 36 through a purifying apparatus comprising an electrodialysis cell indicated diagrammatically at C and thence returned to the inlet 34, so that the liquid flows through the housing 11 against the direction of the centrifugal force due to the rotating disc 10. The electrodialysis cell C is of the type described in U.S. application Ser. No. 719,393, and effects de-ionisation of the liquid passing therethrough by ion exchange, the cell having a spaced anode and cathode. As a result, the liquid circulated through the electrostatic generator is substantially ion-free and therefore has a high resistivity approaching its theoretical value. Consequently the conductivity of the liquid approaches its intrinsic value, and the power output obtainable from the generator is, correspondingly, increased compared with that obtainable from a generator with a conventional gas insulant.

The electrostatic generator according to the invention is relatively compact for a given power output. Thus the rotor disc 10 is typically 30 centimetres in diameter and for a single pair of poles the maximum short circuit current of the order of 1 milliamp. The maximum possible normalised output density in a machine insulated in nitrobenzene is about 9000 watts sec. m.$^{-3}$ equivalent to a rotor power density of 36 watts per square cm. Although the maximum power output is determined by the size of the machine, various combinations of output voltages and current would be possible by using a multi-pole construction. For example by having two pairs of charge supply means connected in parallel and two pairs of charge means also connected in parallel, the output current is doubled. The charge supply means and the charge collector means which are of course equal in number are disposed alternately in angularly spaced apart relationship around the axis of the rotor disc.

Figure 4:
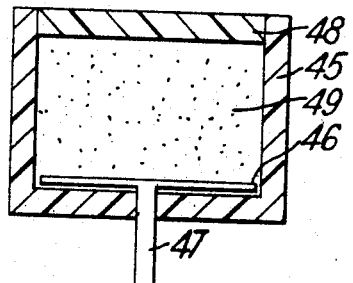
FIG. 4 is an alternative form of part of the structure of FIG. 3.

The inductor means aligned with each charge supply means is preferably of the composite type such as shown in FIG. 4, discussed hereafter.

More than two pairs of charge supply and charge collector means may be provided, provided that the spacing between them is not so small that the insulation afforded by the dielectric liquid therebetween breaks down. The output voltage is determined by the product of the tangential electrostatic field (across the surface of the rotor disc 10) between the charge supply means 12 and the charge collector means 13 and the distance between the charge supply and charge collector means.

The electrostatic generator may be provided with an electro-optical voltage stabilisation system of the type described in said application No. 719,393. Alternatively the generator can be stabilised by a conventional feedback system using a voltage divider network, reference voltage and amplifier such as is used on compressed gas insulated electrostatic generators. A feedback circuit is necessary in order to convert the constant current load characteristic to a constant voltage load characteristic.

As shown in FIG. 2 the housing 11 is formed in two halves 38, 40 which are secured together along mating annular external flanges 41, 42, a sealing ring 43 being provided between the two halves. This construction affords easy access to the rotor disc 10.

For increased output the generator may be provided with several rotor discs 10. Such a multi-disc generator could produce an output current of about 50 milliamps at 100 kilovolts for use, for example, as a high output neutron source.

In their normal mode of operation the inductor plates 31 should ideally merely act as inert polarising electrodes, serving the purpose of attracting charge from the charge supply means 12 and causing it to be injected into the liquid stream and deposited on the surface of the rotor 10. Current from the inductor plates 31 in general serves no useful purpose and can lead to a reduction in output current. It is therefore desirable that the inductor plates 31 should suppress unwanted charge injection into the liquid. By suppressing this injection it is possible to avoid the need for an excitation power supply which has to provide appreciable current.

When using flat inductor plates, such as the plates 31 in the embodiment illustrated above, undesirable output currents may occur and therefore instability is likely to arise due to conduction by metal ions from the plate or from residual impurities in the liquid. Such instability would radically affect the high voltage output. To avoid this instability at least the plate 31 aligned with the charge collector means, and if desired the other inductor plate 31 as well can be formed of superimposed layers of glass sinter, or porous plastics material such as porous P.T.F.E., or such porous plastics materials as those sold under the Trade Names "PORVIC" and "VICRAPOR," and may embody a de-ionising medium.

For example, a composite inductor plate or plates could be employed having a construction similar to that of the plates described in U.S. application Ser. No. 719,393, for use as Kerr cell electrodes. When used in a generator according to the present invention the inductor plates are designed to give low rates of charge injection. Furthermore, such inductor plates tend to give further de-ionization of the liquid in the generator by providing a charge removal mechanism in the vicinity of the inductor since they act as surfaces for the collection of impurities in the liquid. Higher values of electric field, and hence higher charge densities on the rotor surface, may thus be possible.

Thus, a suitable form of composite inductor plate which acts to purify the dielectric liquid by removing ions therefrom is shown in FIG. 4. The composite inductor electrode comprises a cup-shaped housing 45 of an inert plastics material, such as for example, "Nylon" (registered trademark) or P.T.F.E. An electrically conductive element consisting of a metallic inductor plate (corresponding to the plates 31 of FIG. 3) is disposed in the bottom of the housing 45 and has a connection 47 (equivalent to connector 32 of FIG. 3). The cup-shaped housing is closed by a member 48 comprising a sheet of sintered glass or a diaphragm of perforated or porous plastics material (e.g. porous P.T.F.E.) and contains a de-ionising medium 49 between the member 48 and the element 46. The de-ionising medium 49 may be cation exchange beads, anion exchange beads or a mixed bed of ion exchange beads. Molecular sieve material can also be added with advantage. Ion exchange resins suitable for use in such composite electrodes are described in application No. 719,393.

The conductive element 46 is of course arranged to exchange charged particles with the member 48. The sintered glass or porous plastics material used for the member 48 has to be carefully degassed before use in order to remove any trapped air which would lead to breakdown and malfunctioning.

When a perforated plastics diaphragm has been employed as the member 48, it has been found satisfactory if the diaphragm is about 0.5 mm. thick, and perforated with holes of about 5 microns to 150 microns in diameter (i.e. of order 100 microns). The size of the holes is such that the ion exchange beads cannot escape through the holes but such that ions can pass therethrough. A perforated plastics diaphragm has the advantage of greater mechanical strength compared to a porous plastics diaphragm.

By using a composite electrode such as shown in FIG. 4 it is possible to successfully operate the generator when it is sealed off from the electrodialysis cell C provided the dielectric liquid is initially sufficiently ion-free.

Figure 5:
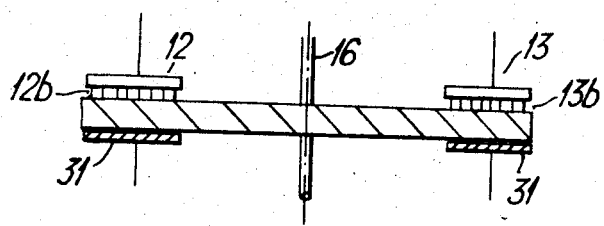
FIGS. 5 and 6 show alternative forms of parts of the structure of FIGS. 1, 2 and 3.

FIG. 5 shows an alternative arrangement of the charge supply means 12 and the charge collector means 13. Those parts of the apparatus not shown are the same as in FIG. 2.

In this construction the knife edges 12b, 13b are straight and tangential to imaginary circles centered on the axis 16 of the disc 10.

The knife edges thus present a low frontal area to the dielectric liquid which due to its viscosity tends to be entrained by the rotating disc and to thereby rotate. The extent of the knife edges is roughly parallel to the movement of the fluid.

The power required to rotate the disc is thus somewhat reduced, and also the generator may operate at a lower temperature.

Furthermore, by arranging the knife edges in this way it is possible to provide an array of knife edges having a relatively long total blade length and a consequent appreciable area for charge collection in the case of the knife edges 13b.

If desired the knife edges may be made arcuate and be centered upon the axis of rotation of the disc 10. They then may be more exactly parallel to the fluid movement.

It will be further appreciated that if the through-flow of dielectric liquid via the inlet 34 and the outlet 36 is such as to materially affect the direction of movement of the liquid, then the knife edges can be suitably directed so that they are parallel to the movement of the liquid.

As indicated above, the rotation of the rotor 10 imparts a rotary motion to the dielectric liquid, and there is therefore a velocity profile in the liquid in the space between the rotor and the housing 11, the liquid adjacent the rotor 10 moving faster than the liquid adjacent the housing 11.

Charge injected into the moving liquid by the charge supply means 12 is thus subjected to two forces. The electric field force would tend to deposit the charge onto the surface of the moving rotor 10 and the moving liquid would tend to transport the charge in the liquid stream towards the charge collector means 13. This latter effect would assist the transport of charge by the rotor 10 since even that charge failing to reach the rotor surface would be swept in the liquid stream to the charge collector means. It is thus possible to increase the charge supplied from the charge supply means 12 by injecting some of it into the liquid streaming past the charge supply means.

It will be appreciated that no separate pump is required to provide the fluid movement, the necessary power being obtained from the motor M driving the rotor 10.

Figure 6:
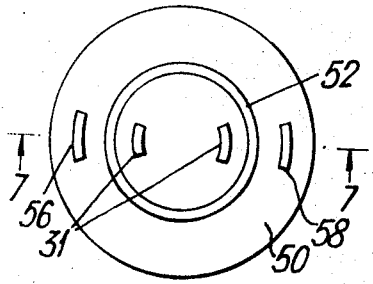
Figure 7:
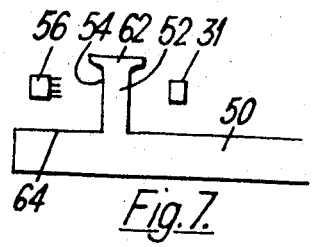
FIG. 7 is a section on line 7—7 of FIG. 6.

FIGS. 6 and 7 show a modification of the invention, in which an electrostatic generator has a rotor disc 50 provided with an axially extending flange 52 defining a cylindrical charge transferring surface 54. Charge supply means 56 and charge collector means 58, are provided at 180° angular spacing from each other. The charge supply means are preferably of the type shown in FIG. 5, but they may be of the type having arcuate knife edges if desired. Angularly aligned with the supply and collector means are respective inductor plates 31. In operation, charge is transferred via the surface 54 of the rotor. The flange 52 is provided with a lip 62 which reduces the tendency for the charge to creep over the top of the flange 52 to the inductor plates 31.

Alternatively, the charge transfer surface may be constituted by the portion 64 of the surface of the rotor disc 50, the flange 52 then acting merely to prevent the charge creeping to the inductor plates 31.

The flange 52 has the effect of increasing the speed at which the dielectric liquid is moved by the rotor. The housing 11 can with advantage be designed to direct the liquid flow close to the charge carrying surface of the rotor.

The use of the surface 54 instead of the surface 64 may be preferable since it may result in a greater charge density on the rotor.

The flange 52 carried by the disc 50 enables an effectively cylindrical rotor to be employed, the cylinder being rigidly supported on a mechanically stiff rotor disc.

Figure 8:
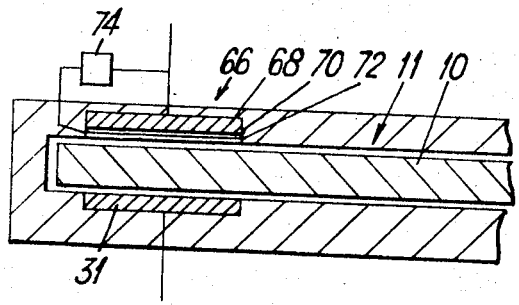
FIG. 8 shows another alternative form of the structure of FIG. 3.

FIG. 8 shows diagrammatically a yet further form of charge supply means.

A charge supply means 66 consists of a semi-conductive element in the form of a tunnel diode comprising a backing member 68 having upon one surface thereof a thin layer 70 of an insulating oxide such as for example aluminum oxide. Over the film 70 is disposed (e.g. by evaporation) an extremely thin film 72 of conducting material such as a metal, for example aluminum.

The charge supply means 66 is flush with the surface of the casing 11, and is not provided with knife edges.

Control of the rate at which the charge is supplied to the dielectric liquid is effected not only by control of the potential difference between the charge collector means and the charge supply means as shown in FIG. 2, but also, indeed preferentially, by means of a control voltage maintained between the backing member 68 and the conductive film 72, by means of a controller 74 which may be of any suitable known form.

Alternatively, the charge supply means 66 could be a silicon carbide diode, in which the charge is transferred to the dielectric liquid by microdischarges.

In electrostatic generators of the type herein described, the charge density at the surface of the rotor is a function of the electric field $E_m$ at the rotor surface. The value of the electric field is greatly influenced by the values of the relative permitivity of the rotor material ($e_r$) and of the liquid ($e_l$). If the ratio of $e_l/e_r$ is $\geqslant 1$, the field at the rotor surface is greatly reduced for a given excitation voltage and hence the output current is low. Ideally the ratio $e_l/e_r$ should be roughly equal to unity. For nitrobenzene $e_l=35$ and for a glass rotor as hereinbefore described $e_r=5$ therefore $$\frac{e_l}{e_r}=7$$

By choosing instead of a glass rotor a rotor of a solid material having $e_r=37$ it would be possible to increase the value $E_m$ by a factor approaching 7 for the same excitation voltage. This would result in a roughly proportional increase in the output current. Thus a considerable improvement in generator performance results if the rotor is of a material having a high resistivity similar or greater than that of glass and also relatively high value of relative permitivity, preferably approaching or exceeding that of the liquid. A suitable material from which the rotor can be made for use with nitrobenzene is barium titanate. Other sintered products may also be suitable.

Further improvement in the power output may be obtained by controlling the conduction processes in the liquid instulation. This can take the form of either an ionic or electronic process and possibly both. For ionic processes it is advantageous to suppress ionisation at the composite inductor plate and enhance it at the knife edge electrode. This can be achieved by electrochemical means and by the use of suitable materials as currently employed in fuel cell technology. A non-exclusive example of such a material is carbon in the form of graphite. As a non-exclusive example of an electronic means of controlling the conduction process in the liquid insulation, it is possible to employ a physical mechanism e.g. to use an ionising radiation source.

We claim:
1. An electrostatic generator comprising:
    charge supply means and charge collector means in spaced apart relationship,
    a charge carrier of dielectric material,
    the charge supply and collector means and the charge carrier being relatively moveable,
    a dielectric liquid in which the charge carrier is disposed,
    purifying means for removing ions from said liquid,
    relative movement of the charge carrier and the charge supply and collector means transferring charge from the charge supply means to the charge collector means, said charge transfer taking place entirely in said liquid.
2. An electrostatic generator as in claim 1 wherein
    the charge supply means and the charge collector means comprise respective knife-edge members,
    the charge carrier having a surface from which the charge supply means and charge collector means are spaced with their knife-edge members directed towards said surface.
3. An electrostatic generator as in claim 2 wherein
    the charge carrier is a disc,
    the said surface being a radially extending face of the disc,
    each knife edge extending radially with respect to the axis of the disc.
4. An electrostatic generator as claimed in claim 2 wherein, in operation, the liquid moves relatively to the said knife edge members, the knife edges of the knife edge members extending at least approximately parallel to said relative movement.
5. An electrostatic generator as in claim 1 wherein inductor means are associated with said charge supply means and said charge collector means, said purifying means comprising, in at least the inductor means associated with the charge collector means, an inductor electrode, a member of porous or perforated material, via which the inductor electrode communicates with the dielectric liquid; and a de-ionizing medium disposed between the inductor electrode and the said member.

6. An electrostatic generator as claimed in claim 1 wherein the charge supply means comprises a semi-conductive element, means being provided to control the rate at which charge transfer occurs by means of a control voltage applied to the semi-conductive element.

7. An electrostatic generator as claimed in claim 1 wherein the purifying means includes purifying apparatus for removing ions from said liquid and means for circulating said liquid in a closed circuit between the generator and said purifying apparatus.

8. An electrostatic generator as in claim 1 wherein the charge carrier is made of a material having a resistivity not less than that of glass and has a relative permitivity not significantly less than that of the dielectric liquid the charge carrier in operation having a relatively low value of electric field therein, the liquid having a relatively high value of electric field therein.

9. An electrostatic generator comprising:

input electrode means, output electrode means spaced apart therefrom, a charge carrier, the electrodes and the charge carrier being relatively moveable to develop a potential difference between the input and output electrode means, a dielectric liquid between the electrode means and the charge carriers, and purifying means for removing ions from said liquid, said purifying means comprising:

an inductor electrode, a member of porous or perforated material via which the inductor electrode communicates with a dielectric liquid, and a de-ionizing medium disposed between the inductor electrode and the said member.

10. An electrosatic generator as claimed in claim 9 wherein the porous material is sintered glass.

11. An electrostatic generator as claimed in claim 9 wherein the porous material is a porous plastics material.

12. An electrostatic generator as claimed in claim 9 wherein the member comprises a plastics diaphragm perforated by a plurality of holes which permit the passage of ions therethrough but prevent the escape of de-ionising medium therethrough.

13. An electrostatic generator comprising:

charge supply means and charge collector means in spaced apart relationship, a charge carrier of dielectric material which is insulated from the charge supply means and charge collector means, the charge supply and charge collector means and the charge carrier being relatively moveable, transferring in operation a charge from the charge supply means to the charge collector means, the charge supply means comprising a semi-conductive element, means being provided to control the rate of charge transfer for applying a control voltage to the semi-conductive element.

14. An electrostatic generator as claimed in claim 13 wherein the semi-conductive element is a tunnel diode.

References Cited

UNITED STATES PATENTS

| 2,701,844 | 2/1955 | Wason | 310—6 |
| 2,739,248 | 3/1956 | Meier | 310—6 |
| 3,024,371 | 3/1962 | Lefkowitz | 310—5 X |
| 3,192,414 | 6/1965 | Reusser | 310—6 |
| 3,400,282 | 9/1968 | Felici | 310—6 |
| 3,443,856 | 5/1969 | Felici et al. | 204—180 |
| 3,444,062 | 5/1969 | Felici et al. | 204—301 |

FOREIGN PATENTS

| 766,055 | 1/1957 | Great Britain. |
| 1,006,502 | 4/1957 | Germany. |

DONOVAN F. DUGGAN, Primary Examiner

U.S. Cl. X.R.

310—6